United States Patent
Soisson et al.

(10) Patent No.: US 12,084,779 B2
(45) Date of Patent: Sep. 10, 2024

(54) METHOD FOR PRODUCING A METAL BLADED ELEMENT FOR A TURBOMACHINE OF AN AIRCRAFT

(71) Applicants: SAFRAN AIRCRAFT ENGINES, Paris (FR); SAFRAN, Paris (FR)

(72) Inventors: Marc Soisson, Moissy-Cramayel (FR); Said Boukerma, Moissy-Cramayel (FR); Janusz Lisowski, Moissy-Cramayel (FR); Alexandre Gimel, Moissy-Cramayel (FR); Amar Saboundji, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 552 days.

(21) Appl. No.: 15/733,743

(22) PCT Filed: Apr. 19, 2019

(86) PCT No.: PCT/FR2019/050948
§ 371 (c)(1),
(2) Date: Oct. 12, 2020

(87) PCT Pub. No.: WO2019/202281
PCT Pub. Date: Oct. 24, 2019

(65) Prior Publication Data
US 2021/0156034 A1   May 27, 2021

(30) Foreign Application Priority Data
Apr. 19, 2018 (FR) ........................... 1853476

(51) Int. Cl.
*C23F 1/04* (2006.01)
*B22C 7/02* (2006.01)
(Continued)

(52) U.S. Cl.
CPC ............... *C23F 1/04* (2013.01); *B22C 9/10* (2013.01); *B22C 9/24* (2013.01); *B23P 15/02* (2013.01);
(Continued)

(58) Field of Classification Search
None
See application file for complete search history.

(56) References Cited

U.S. PATENT DOCUMENTS 6,588,485 B1   7/2003   Decker
8,506,256 B1   8/2013   Brostmeyer et al.
(Continued)

FOREIGN PATENT DOCUMENTS

CN   102817034 A   12/2012
CN   103602985 A   2/2014
(Continued)

OTHER PUBLICATIONS

International Search Report received for PCT Patent Application No. PCT/FR2019/050948, mailed on Jul. 10, 2019, 6 pages (2 pages of English Translation and 4 pages of Original Document).
(Continued)

*Primary Examiner* — Shamim Ahmed
(74) *Attorney, Agent, or Firm* — WOMBLE BOND DICKINSON (US) LLP

(57) ABSTRACT

The invention relates to a method for producing a metal bladed element for a turbomachine of an aircraft, said bladed element comprising at least one blade having a lower surface and an upper surface extending between a leading edge and a trailing edge of the blade, the trailing edge having to have a thickness X1, said method comprising the steps of: a) producing the bladed element by lost-wax casting, and b) finishing the bladed element, characterised in that step b) comprises the chemical milling at least of the trailing edge (Continued)

of the or each blade so as to obtain said thickness X1 which cannot be directly obtained by step a).

9 Claims, 3 Drawing Sheets

(51) Int. Cl.
     *B22C 9/10*     (2006.01)
     *B22C 9/24*     (2006.01)
     *B23P 15/02*     (2006.01)
     *F01D 5/14*     (2006.01)

(52) U.S. Cl.
     CPC ................. *F01D 5/14* (2013.01); *B22C 7/02* (2013.01); *F05D 2220/323* (2013.01); *F05D 2230/10* (2013.01); *F05D 2230/21* (2013.01)

(56) References Cited

U.S. PATENT DOCUMENTS

| | | | |
|---|---|---|---|
| 2002/0125215 A1 | 9/2002 | Davis et al. | |
| 2002/0185244 A1 | 12/2002 | Decker et al. | |
| 2011/0299990 A1 | 12/2011 | Marra et al. | |
| 2013/0330201 A1 | 12/2013 | Digard Brou De Cuissart et al. | |
| 2017/0151605 A1 | 6/2017 | Marques et al. | |

FOREIGN PATENT DOCUMENTS

| | | |
|---|---|---|
| CN | 106470781 A | 3/2017 |
| EP | 1239059 A2 | 9/2002 |
| FR | 2985925 A1 | 7/2013 |
| FR | 2991612 A1 | 12/2013 |

OTHER PUBLICATIONS

First Office Action received for Chinese Patent Application No. 201980029809.8, mailed on Aug. 8, 2022, 2 pages of English Translation Only.

International Preliminary Report on Patentability received for PCT Patent Application No. PCT/FR2019/050948, mailed on Oct. 29, 2020, 15 pages (8 pages of English Translation and 7 pages of Original Document).

Search Report received for Chinese Patent Application No. 201980029809.8, mailed on Aug. 2, 2022, 2 pages.

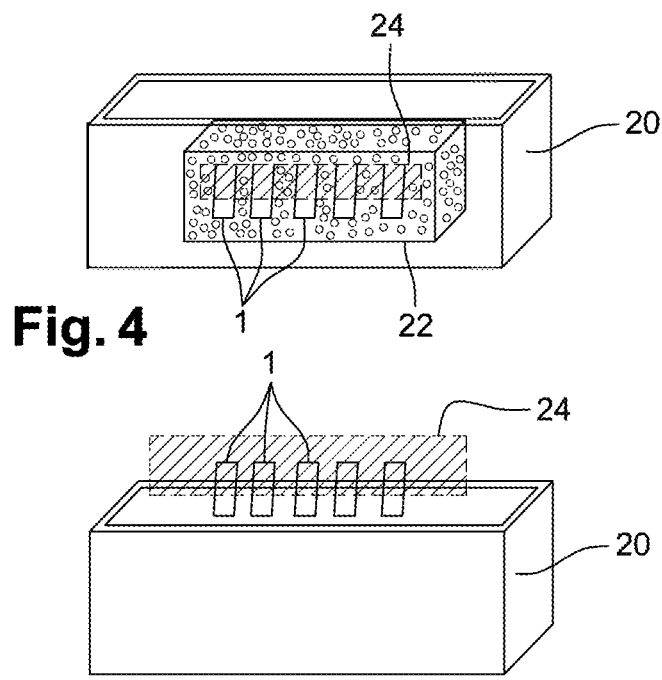
Fig. 4
Fig. 5
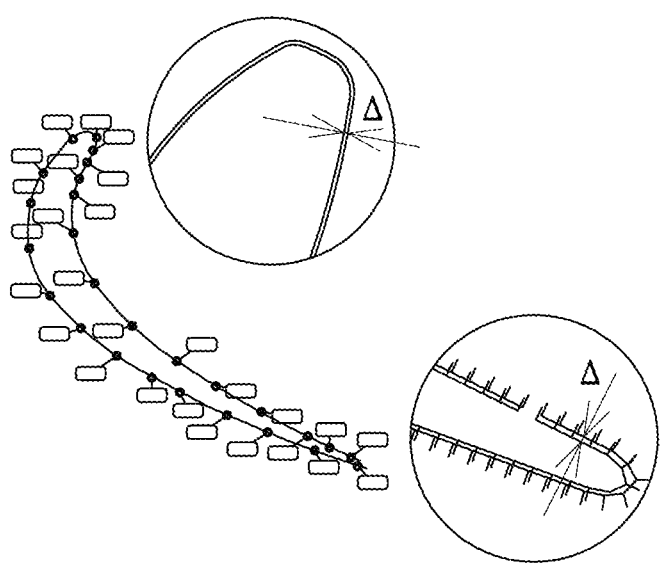
Fig. 6
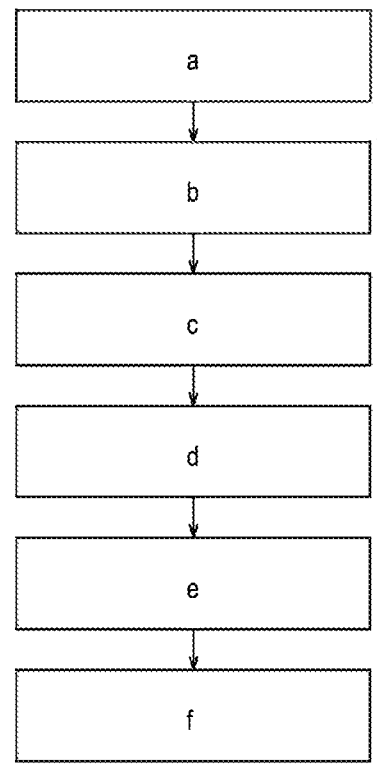
Fig. 7

METHOD FOR PRODUCING A METAL BLADED ELEMENT FOR A TURBOMACHINE OF AN AIRCRAFT

TECHNICAL FIELD

The present invention relates to the general field for producing metallic bladed elements for an aircraft turbine engine, these bladed elements can be stator or rotor elements.

BACKGROUND

A turbine engine bladed element comprises of one or more blades. For example, a rotor vane, such as a turbine moving vane, comprises a single blade which is connected to a root intended to be fitted in a complementary shaped recess of a rotor disc. A turbine nozzle, for example, comprises several blades that extend between inner and outer platforms.

The production of a bladed element by lost-wax casting is a well-known technique in the aeronautical field. Such a technique is for example described in the document FR-A1-2 985 924. As a reminder, the lost-wax casting consists in making a wax model of each of the desired bladed elements by injection into a mold. The assembly of these models on casting arms also made of wax, which are themselves connected to a wax metal dispenser, makes it possible to form a cluster which is then immersed in different substances in order to form around it a ceramic shell of substantially uniform thickness. The method is continued by melting the wax, which then leaves its exact imprint in the ceramic, into which the molten metal is poured, via a pouring cup assembled on the metal dispenser. After the metal has cooled, the shell is destroyed and the metal parts are separated and finished. This technique offers the advantage of dimensional accuracy as well as a very good surface appearance.

One of the difficulties of this technique, however, is to obtain a fine profile and especially a fine trailing edge. A blade has an aerodynamic profile and comprises a pressure side and suction side extending between the leading and trailing edges of the gases in the turbine engine. The trailing edge of a blade is ideally as thin as possible to limit aerodynamic disturbances of the gas flow downstream of the vane.

However, even if the lost-wax casting makes it possible to obtain bladed elements with precise dimensions, this technique does not make it possible to obtain very small dimensions and thus to carry out sufficiently fine trailing edges in particular for the small dimensioned bladed elements.

The present invention offers a simple, effective and economical solution to this problem.

DISCLOSURE OF THE INVENTION

The present invention provides a method for producing a metal bladed element for an aircraft turbine engine, this bladed element comprising at least one blade comprising a pressure side and a suction side extending between a leading edge and a trailing edge of the blade, the trailing edge having to have a thickness $X1$, the method comprising the steps of:
a) producing the bladed element by lost-wax casting, and
b) finishing the bladed element,
characterized in that the step b) comprises the chemical milling at least of the trailing edge of the or each blade so as to obtain said thickness $X1$ which cannot be directly obtained by the step a).

As mentioned above, the lost-wax casting makes it possible to obtain a bladed element with precise dimensions. However, it allows to have a minimum material thickness dimension noted $X2$, which is greater than $X1$. The goal is to produce the bladed element with a trailing edge with a thickness $X1$, that is to say thinner than the one (with a thickness $X2$) which could be directly obtained by the lost-wax casting. According to the invention, this is made possible by the chemical milling of this trailing edge, the chemical milling making it possible to remove a sufficient quantity of material on the surface to pass from $X2$ to $X1$.

In the present application, a distinction is made between an "etching" and a "chemical milling". An etching is carried out on a part during a material health inspection operation. The etching exposes material grains on the surface of the part (by removing the grain joints), which are then checked to determine the material health of the part. In this case, the chemical milling is used to remove material and in particular material thickness from the surface of a bladed element. The purpose of milling is to remove the material between the material grains but also the grains themselves, until a material removal of the desired thickness is obtained. The parameters and conditions of chemical milling are therefore such that a desired material thickness can be removed.

The method according to the invention may comprise one or more of the following characteristics and/or steps, taken in isolation from each other or in combination with each other:

- the thickness $X1$ is less than 1 mm, preferably less than or equal to 0.5 mm and more preferably between 0.2 and 0.45 mm,
- the thickness $X1$ is measured in a direction transverse to the bladed element,
- the chemical milling removes a material thickness at the surface of between 0.05 and 0.5 mm, and more preferably between 0.05 and 0.15 mm,
- the material thickness comprises grains and material joints,
- the bladed element is made of a metal alloy based on nickel, cobalt or chromium,
- the method comprise at least one subsequent step selected from: a step of inspecting material health, a step of inspecting final dimensioning, a step of surfacing by tribofinishing,
- the chemical milling is carried out by immersing the bladed element in a chemical milling bath,
- the bladed element is partially immersed in the bath, wherein the bladed element may comprise masked zones so that they are not milled in contact with the bath,
- the bladed element is fully immersed in the bath, wherein the bladed element may comprise masked zones so that they are not milled in contact with the bath,
- the bladed element is immersed in the bath for a period of between 10 and 300 min, the bath temperature being between 20 and 70° C.,
- the bath is water-based and comprises HCl in a concentration of between 25 and 300 g/L, the bath may additionally comprise at least one other of the following components:
  $FeCl_3$ at a concentration of between 100 and 500 g/L,
  $HNO_3$ at a concentration of between 10 and 40 g/L,
  $H_2O_2$ at a concentration of between 100 and 200 ml/L.
- the step b) comprises a prior step of etching of at least part of the bladed element,
- the etching is carried out by immersing the bladed element in an etching bath, the etching and chemical milling baths are identical, the etching and chemical milling differ from each other at least by the immersion time of the bladed element in the bath.

BRIEF DESCRIPTION OF THE FIGURES

The invention will be better understood and other details, characteristics and advantages of the invention will appear more clearly when reading the following description made as a non-limitative example and with reference to the appended drawings in which:

FIG. 4 is a very schematic perspective view of a chemical milling bath tank in which bladed elements are entirely immersed, and illustrates a step of a method according to the invention, FIG. 5 is a very schematic perspective view of a chemical milling bath tank in which bladed elements are partially immersed, and illustrates an alternative embodiment of a step of a method according to the invention, FIG. 6 is a similar view to FIG. 3 and represents a material removal by chemical milling, and FIG. 7 is a block diagram showing steps in a producing method according to the invention.

DETAILED DESCRIPTION OF AN EMBODIMENT

The invention applies to a bladed element which is, for example, a vane, rectifier, a nozzle, a moving vane, etc., of an aircraft turbine engine.

Figure 1:
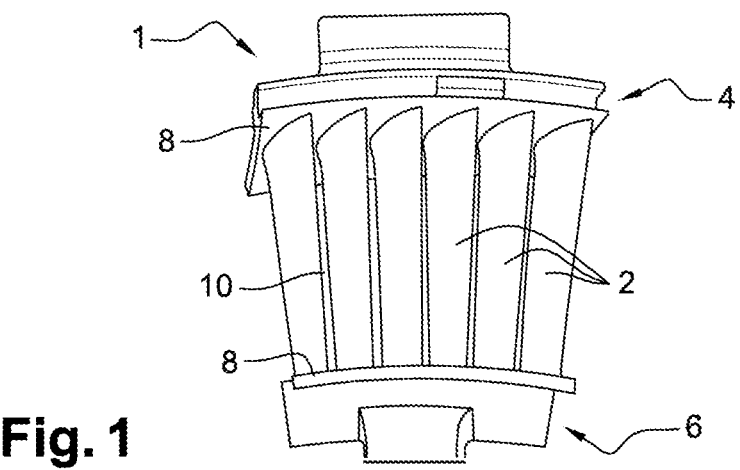
FIG. 1 is a schematic perspective view of a bladed element of a turbine engine.

FIG. 1 illustrates a turbine nozzle 1 of a turbine engine and more particularly a sector of this nozzle which is annular and sectorized and thus comprises several sectors arranged circumferentially end to end around an axis which is the longitudinal axis of the turbine engine.

This sector comprises a plurality of blades 2 arranged between a first end 4 and a second end 6. The two ends 4, 6 form respectively an outer and an inner ring angular sector, and each comprise a platform 8 delimiting a main gas flow duct 10. In addition to the platform 8, to which an aerodynamic function is attached, each end also comprises a conventional structure allowing this bladed element to be mounted on a turbine engine module, in this case a turbine module.

Figure 2:
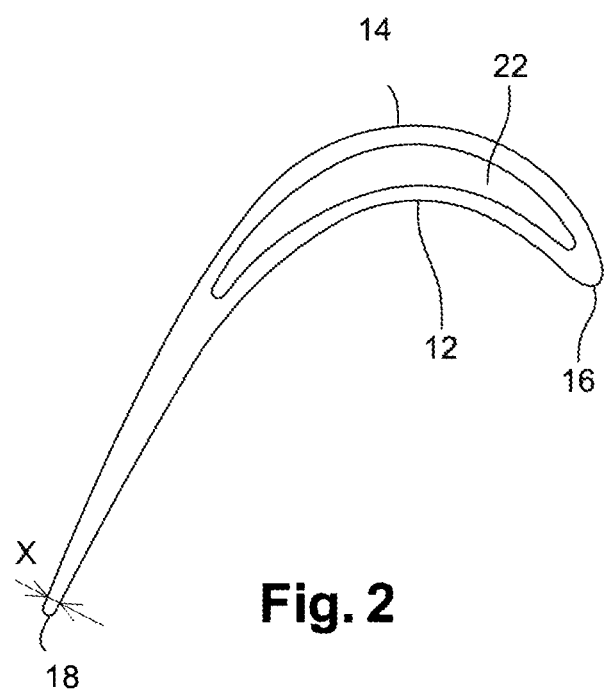
FIG. 2 is a schematic cross-sectional view of a blade of a turbine engine bladed element.

Each blade 2 has an aerodynamic profile visible in FIG. 2 and comprises a pressure side 12 and a suction side 14 which extend between edges 16, 18, respectively upstream or leading edges of the gases, and downstream or trailing edges of the gases, which flow in the duct 10. It can be seen that the thinnest part, i.e. the one with the smallest thickness (thickness X), is the one located at and along the trailing edge 18 of the blade 2. The thickness X is measured in a direction transverse to the blade.

FIG. 2 also shows that the blade 2 here is hollow and comprises a cavity 22 in the centre of the part so as to lighten the mass of the vane and thus the turbine as a whole and/or to allow the flow of gas radially towards the interior of the engine in order to cool the part.

Figure 3:
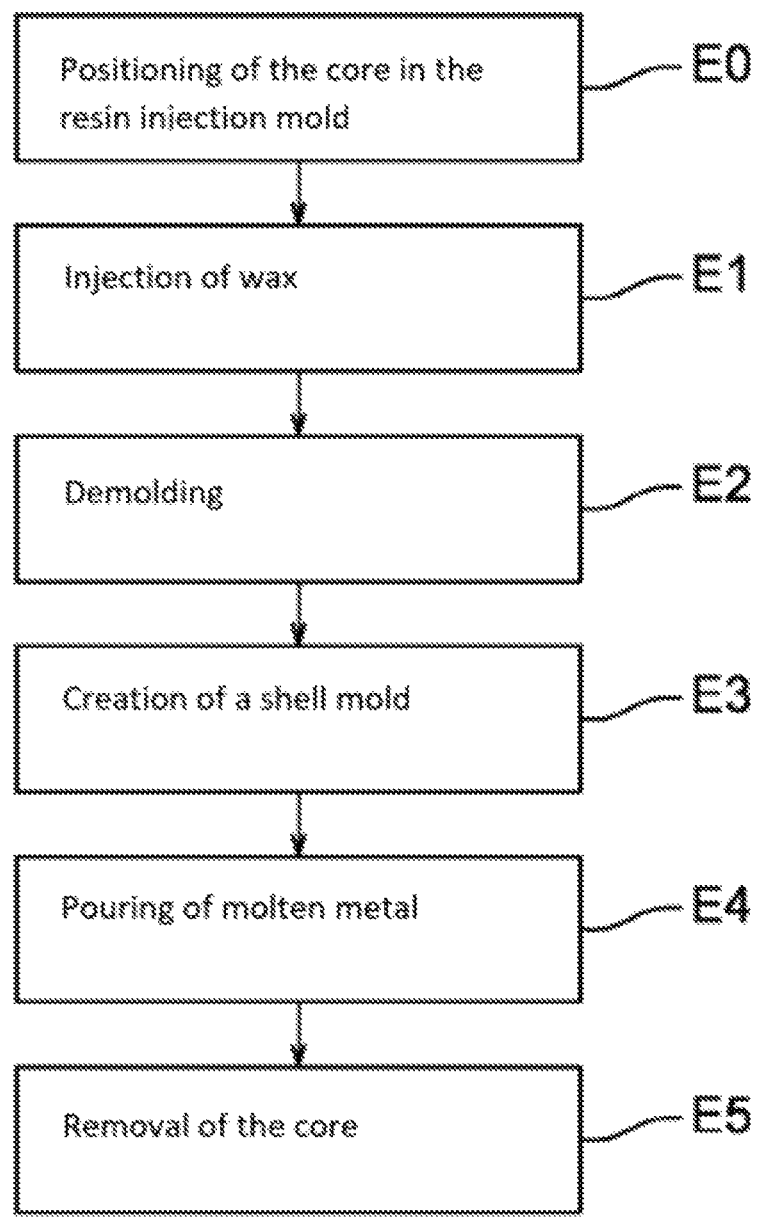
FIG. 3 is a block diagram showing steps in a method for producing a bladed element by lost-wax casting.

The invention aims to produce the nozzle sector 1, and more generally any turbine engine bladed element, by a producing method comprising a step of lost-wax casting, the steps of which are shown in FIG. 3.

The lost-wax casting step may comprise several sub-steps, including a preliminary sub-step E0 during which a core, for example made of ceramic, is positioned in a resin injection mold. This mold has a shape corresponding to that of the cavity 22 to be formed. In the case where several blades are manufactured simultaneously, which is the case with a nozzle sector, several cores are positioned in the same mold for making this nozzle.

The mold is then closed and the wax is injected during a sub-step E1, the wax coating the cores in particular, for the making of the wax model of the nozzle sector to be produced.

After cooling and solidification, a sub-step E2 of demolding of the wax model takes place. The next sub-step E3 comprises the making of a ceramic shell mold around the wax model, into which the molten metal is poured in a sub-step E4.

The wax is removed before or during the casting of the molten metal and the resulting recesses between the cores and the shell mold are filled with the molten metal to form the nozzle sector, while the solid parts of the core become cavities after removal of the ceramic core in a sub-step E5. The parts can be obtained by equiaxed casting or by directional solidification.

The method according to the invention comprises an additional step of finishing the bladed element comprising at least a partial chemical milling of the bladed element. The chemical milling consists here in using a chemical substance to machine the material by dissolution, i.e. to remove a given quantity of material. In practice, the chemical milling can be carried out by immersing the bladed element in a chemical bath under suitable conditions to obtain the desired result which is removing material on the surface and thinning at least locally the bladed element.

As mentioned above, the lost-wax casting allows the manufacture of bladed elements with precise dimensions but does not allow very thin thicknesses, for example less than 1 mm, and more particularly less than or equal to 0.5 mm. This lower limit of thickness, which can be obtained by the lost-wax casting, is noted X2.

It is therefore understood that the minimum thickness of the trailing edge 18 of a blade, which can be obtained by the lost-wax casting, is X2. The thickness X2 corresponds to the considered thickness of the metal casting crude.

To reduce this thickness to a desired value, noted X1, the invention uses the chemical milling. The trailing edge of the blade is therefore chemically milled to reduce its thickness from X2 to X1, by chemical removal of material. X1 is for example less than 1 mm, preferably less than or equal to 0.5 mm and more preferably between 0.2 and 0.45 mm.

FIGS. 4 and 5 illustrate two examples of the implementation of this chemical milling step, wherein the bladed element is immersed in a chemical milling bath.

In practice, it is more efficient to machine several parts simultaneously. It is therefore possible to provide a tank 20 containing a chemical milling bath and capable of accommodating several bladed elements simultaneously. The bladed elements, such as nozzles 1, can be positioned at the bottom of a sieve 22, i.e. a container with a multitude of holes. Both the sieve 22 and the bladed elements are fully immersed in the bath of the tank, and the bath comes into contact with the bladed elements by passing through the holes in the sieve 22.

This allows the chemical milling of all the surfaces of the bladed elements that are in contact with the bath, and thus in particular the pressure side 12 and suction side 14 as well as the leading 16 and trailing 18 edges of the blades 2. If only a localized milling is required, especially at the leading edge to reduce the thickness, one or more masks 24 can be used on the bladed elements. These masks 24 are intended to protect the surfaces of the bladed elements of the bath, and therefore not to subject them to the chemical milling. The masks 24 are here schematically represented by a rectangle with dotted and hatched lines.

FIG. 5 shows an alternative embodiment in which the bladed elements are only partially immersed in the bath of the tank. In this case, the masks 24 are not necessarily required, except to protect surfaces that must be immersed because of the shape of the parts, in order to obtain the desired localized chemical milling.

FIG. 6 shows a schematic illustration of the material removal A that can be envisaged on the surface of a blade of a bladed element. For example, the chemical milling removes a surface material thickness between 0.05 and 0.5 mm, preferably between 0.05 and 0.15 mm, in the zones where a chemical milling actually takes place.

FIG. 7 illustrates several steps of an embodiment of a method according to the invention.

The first step a) is making the bladed element by lost-wax casting. Among the following steps, there is the finishing of the bladed element and in particular its final dimensioning. This finishing step b) comprises the chemical milling of the bladed element. After or (preferably) before this chemical milling, the method may comprise a step c) of inspecting the material health. This step may comprise macrographic inspection of the material grains, penetrant inspection, radiographic inspection, visual inspection, etc., and may comprise a preliminary sub-step of etching during which inter-grain joints are removed by chemical dissolution, as mentioned above. The etching baths may be similar to chemical milling baths, but the immersion time is generally different depending on whether dissolution of the joints only (for etching), or of the joints and grains (for chemical milling), is sought. For example, the immersion time in a chemical milling bath is at least 3 times longer, and preferably at least 9 times longer, than the immersion time in an etching bath.

The fact of carrying out the chemical milling does not modify the classical production range of the bladed element. It is possible to combine the etching and chemical milling, thus optimizing the production range, saving time and thus reducing costs. There is thus no multiplication of steps as with conventional milling.

The chemical milling can be supplemented by electrolytic milling (step d)) to improve the surface finish of the bladed element. This additional milling step can consist of immersing the bladed element totally or partially in an electrolytic bath containing for example one or more of the following reagents: nitric acid, acetic acid, sulfuric acid and phosphoric acid.

After the chemical or even electrolytic milling, the method may comprise a step e) for inspecting the final dimensioning and/or a step f) for surfacing by tribofinishing. This last step, which is not necessarily required if the method comprises the step d), allows to improve the surface condition of the bladed element, and makes it possible, for example, to obtain roughness of between 1 and 5 μm, and preferably between 1.6 and 3.5 μm.

The invention applies in particular but not exclusively to the production of bladed elements made of a Nickel-based metal alloy (R125, R77, INCO718, Monocrystals, DS200, . . . ), Chromium-based, or Cobalt-based (MARM509, . . . ).

The tables 1 to 3 below illustrate examples of chemical bath compositions for the implementation of the chemical milling step. In each table, the left-hand column lists several examples of metal alloys and the following columns illustrate, on the one hand, the parameters of time (Time in minutes) of immersion of the bladed element in the bath, and temperature (Temp.) of the bath, and on the other hand, the chemical components of this bath.

Each bath is water-based and contains hydrochloric acid (HCl) in a concentration between 25 and 300 g/L. In addition, the bath may contain at least one other of the following components:

$FeCl_3$ (iron chloride) at a concentration between 100 and 500 g/L, $HNO_3$ (nitric acid) at a concentration between 10 and 40 g/L, $H_2O_2$ (hydrogen peroxide) at a concentration between 100 and 200 ml/L.

The rest of the bath is water in a sufficient quantity equivalent to 1 L.

More specifically, the table 1 comprises examples of bath compositions in which HCl is essentially associated with $FeCl_3$. The table 2 comprises examples of bath compositions in which HCl is predominantly associated with $FeCl_3$ and $HNO_3$. The table 3 comprises examples of bath compositions in which HCl is predominantly associated with $H_2O_2$. According to other variants, the bath could comprise a combination of HCL and $HNO_3$, or only HF—$HNO_3$ fluonitric acid.

TABLE 1

| | Chemical milling (min/max) | | | | |
| --- | --- | --- | --- | --- | --- |
| | Time (min) | Temp (° C.) | $FeCl_3$ (g/l) | HCl (g/l) | Water (g/l) |
| AM1 and other monocrystalline alloys without (Ru and/or Re): example AM1 | 80-150 | 50 ± 20 | 300-500 | 25-45 | qsp 1 l |
| R125 and other nickel-based alloys | 80-150 | 50 ± 20 | 300-500 | 25-45 | qsp 1 l |
| R77 | 10-40 | 50 ± 20 | 300-500 | 25-45 | qsp 1 l |
| DS200 and other columnar alloys | 40-80 | 50 ± 20 | 300-500 | 25-45 | qsp 1 l |
| IN100 | 10-40 | 50 ± 20 | 300-500 | 25-45 | qsp 1 l |
| Monocrystalline alloys with (Ru and/or Re) | 40-80 | 50 ± 20 | 300-500 | 25-45 | qsp 1 l |

TABLE 2

| | Chemical milling (min/max) | | | | | |
|---|---|---|---|---|---|---|
| | Time (min) | Temp (° C.) | FeCl3 (g/l) | HCl (g/l) | HNO3 (g/l) | Water (g/l) |
| AM1 and other monocrystalline alloys without (Ru and/or Re): example AM1 | 10-20 | 40 ± 20 | 100-200 | 150-300 | 10-40 | qsp 1 l |
| R125 and other nickel-based alloys | 10-20 | 40 ± 20 | 100-200 | 150-300 | 10-40 | qsp 1 l |
| R77 | 1-4 | 40 ± 20 | 100-200 | 150-300 | 10-40 | qsp 1 l |
| DS200 and other columnar alloys | 5-15 | 40 ± 20 | 100-200 | 150-300 | 10-40 | qsp 1 l |
| IN100 | 1-4 | 40 ± 20 | 100-200 | 150-300 | 10-40 | qsp 1 l |
| Monocrystalline alloys with (Ru and/or Re) | 5-15 | 40 ± 20 | 100-200 | 150-300 | 10-40 | qsp 1 l |

TABLE 3

| | Chemical milling (min/max) | | | | |
|---|---|---|---|---|---|
| | Time (min) | Temp (° C.) | $H_2O_2$ (ml/l) | HCl (ml/l) | Water (ml/l) |
| AM1 and other monocrystalline alloys without (Ru and/or Re): example AM1 | 200-300 | 40 ± 20 | 100-200 | 200-300 | 400-700 |
| R125 and other nickel-based alloys | 200-300 | 40 ± 20 | 100-200 | 200-300 | 400-700 |
| R77 | 10-40 | 40 ± 20 | 100-200 | 200-300 | 400-700 |
| DS200 and other columnar alloys | 75-250 | 40 ± 20 | 100-200 | 200-300 | 400-700 |
| IN100 | 10-50 | 40 ± 20 | 100-200 | 200-300 | 400-700 |
| Monocrystalline alloys with (Ru and/or Re) | 100-200 | 40 ± 20 | 100-200 | 200-300 | 400-700 |

It can be seen that the immersion time in the bath is between 10 and 300 min, and more specifically between 10 and 150 min in the case of a bath according to the table 1, between 1 and 20 min in the case of a bath according to table 2, and between 10 and 300 min in the case of a bath according to the table 3.

We observe that the temperature of the bath is between 20 and 70° C., and more specifically between 30 and 70° C. in the case of a bath according to the table 1, and between 20 and 60° C. in the case of a bath according to tables 2 and 3.

It can be seen that the amount of HCl varies according to the presence and quantity of the other components of the bath as well as the temperature and immersion time.

The removal of material is characterized by dissolution curves that depend, for example, on the material, the chemicals used, the aging of the bath, the concentration of the chemical milling bath, the temperature of the bath, the agitation of the bath, the position of the workpiece in the bath, etc. Once these parameters are fixed, the material removal can be proportional to the number of immersions and the treatment time in the bath.

The invention claimed is:

1. A method for producing a metal bladed element for an aircraft turbine engine, this bladed element comprising at least one blade comprising a pressure side and a suction side extending between a leading edge and a trailing edge of the blade, the trailing edge having to have a thickness X1, the method comprising the steps of:
   a) producing the bladed element by lost-wax casting, the trailing edge having a thickness X2 during the step a),
   b) finishing the bladed element,
   wherein the step b) comprises a chemical milling at least of the trailing edge of the or each blade so as to obtain said thickness X1 which cannot be directly obtained by the step a), the thickness X1 being less than the thickness X2,
   wherein the chemical milling is carried out by immersing the bladed element in a chemical milling bath for a period of between 10 and 300 minutes, the chemical milling bath temperature being between 20 and 70° C., wherein the chemical milling bath is water based and comprises:
   HCl in a concentration of between 25 g/L to 45 g/L, and $FeCl_3$ at a concentration of between 300 g/L and 500 g/L.

2. The method according to claim 1, wherein the thickness X1 is less than 1 mm.

3. The method according to claim 1, wherein the chemical milling removes a material thickness at the surface of between 0.05 and 0.5 mm.

4. The method according to claim 1, wherein the bladed element is made of a metal alloy based on nickel, cobalt or chromium.

5. The method according to claim 4, wherein it the method comprises at least one subsequent step selected from: a step of inspecting material health, a step of inspecting final dimensioning, and a step of surfacing by tribofinishing.

6. The method according to claim 1, wherein the bladed element is partially immersed in the bath, wherein the bladed element may comprise masked zones so that they are not milled in contact with the bath.

7. The method according to claim 1, wherein the bladed element is fully immersed in the bath, wherein the bladed element may comprise masked zones so that they are not milled in contact with the bath.

8. The method according to claim 1, wherein the step b) comprises a prior step of etching at least part of the bladed element by immersing the bladed element into an etching bath.

9. The method according to claim 1, wherein the chemical milling bath temperature is of 50° C.

* * * * *